Figure 1:
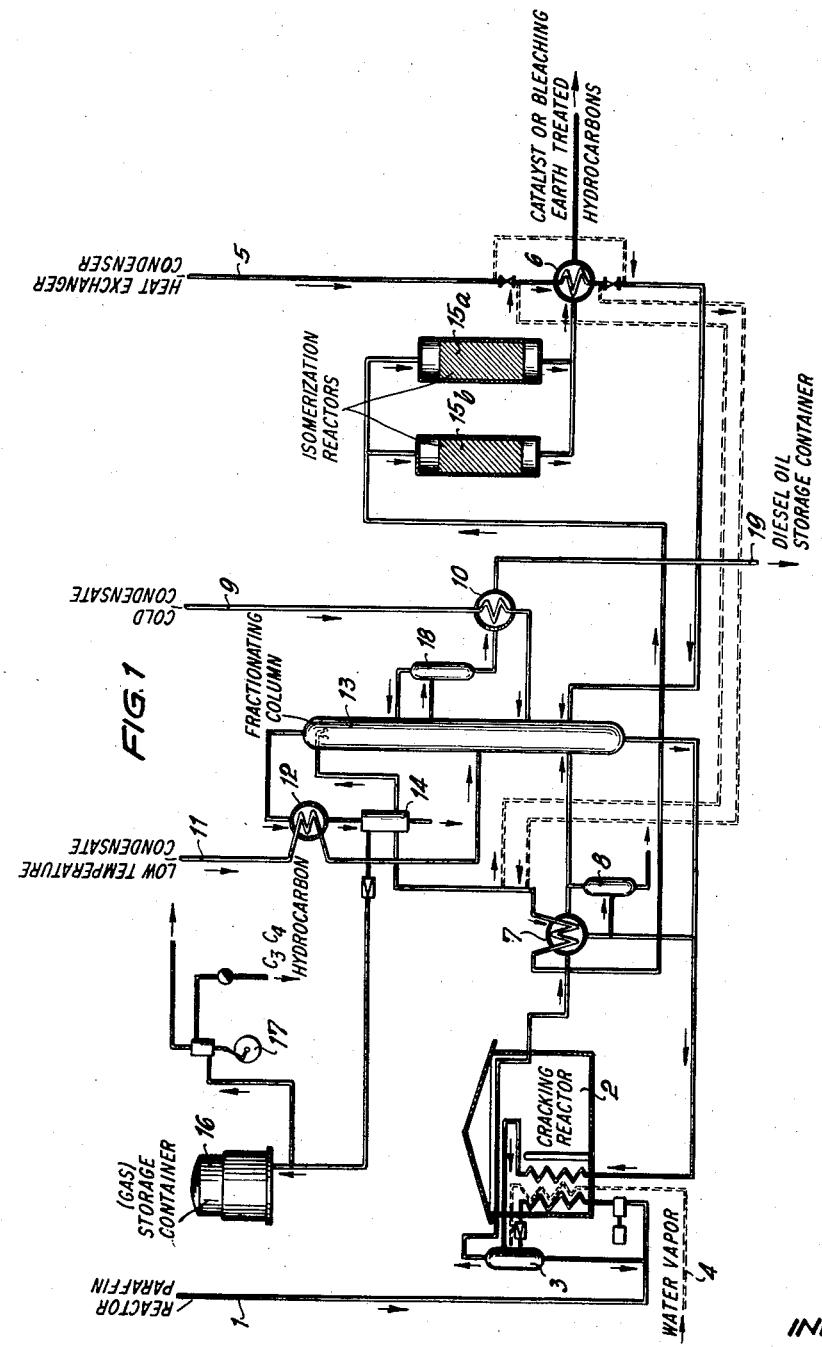

Jan. 20, 1959  F. SCHNUR  2,870,185
WORKING UP OF PRODUCTS FROM THE CATALYTIC
HYDROGENATION OF CARBON MONOXIDE
Filed March 3, 1954  2 Sheets-Sheet 2

FIG. 2

INVENTOR
FRIEDRICH SCHNUR
By Burgess + Dinklage
Attorneys

United States Patent Office 2,870,185
Patented Jan. 20, 1959

2,870,185
WORKING UP OF PRODUCTS FROM THE CATALYTIC HYDROGENATION OF CARBON MONOXIDE

Friedrich Schnur, Oberhausen-Sterkrade, Germany, assignor to Ruhrchemie Aktiengesellschaft, Oberhausen-Holten, Germany, a corporation of Germany, and Lurgi Gesellschaft für Warmetechnik m. b. H., Frankfurt am Main, Germany, a corporation of Germany Application March 3, 1954, Serial No. 413,810

Claims priority, application Germany March 5, 1953

9 Claims. (Cl. 260—450)

This invention relates to improvements in the working up of products from the catalytic hydrogenation of carbon monoxide.

As is well known, synthesis products which boil within wide limits are obtained from catalytic carbon monoxide hydrogenation depending upon the synthesis conditions and the catalysts used. As reaction products flow from the reactors, at first the liquid high boiling hydrocarbon mixtures are separated. These liquid high boiling hydrocarbon mixtures are termed the "reactor paraffins."

After the separation of these reactor paraffins, the temperature of the reactor gas is decreased to about 100° C. as, for example, with the use of heat exchangers. As a result of this cooling a condensate is obtained and recovered which is termed the "heat exchanger condensate."

After removal of the "heat exchanger condensate," the gas is further cooled to normal room temperature which results in the formation and recovery of the so-called "cold condensate."

The gases remaining after the removal of the "cold condensate" are subjected to an oil scrubbing or to cooling to temperatures as low as −40° C. or to suitable treatment with active carbon for recovery of the "low temperature condensate."

It is often desirable to obtain as large a quantity as is possible of motor fuels from the catalytic hydrogenation of carbon monoxide. In order to obtain these motor fuels, the synthesis products of different boiling ranges are separated from the reaction water and the products dissolved therein, and processed. These products which are processed include a primary gasoline fraction, a diesel oil fraction and still higher boiling hydrocarbons. The higher boiling hydrocarbon mxtures, i. e. the "reactor paraffins" are subjected to a thermal or catalytic cracking. Since the products of the catalytic carbon monoxide hydrogenation predominantly consist of straight-chain and saturated hydrocarbons, the cracking of these products as contrasted with the cracking of natural petroleum products may be effected without the formation of coke, hydrogen-poor fuel oils, aromatic hydrocarbons, resins and cracking residues.

The primary gasolines and cracked gasolines obtained are subjected to a hot reforming after treatment with bleaching earths or other aluminum silicates at elevated temperatures as, for example, at about 450° C. This results in an isomerization and a displacement of the unsaturated double linkages from the terminal to the middle position in the molecule.

One object of this invention is a process for the operation of a thermal cracking reactor, a fractionating column and a hot reforming unit for the processing of synthesis products from carbon monoxide hydrogenation into gasoline and diesel oil which is extremely favorable from an operational point of view with respect to heat economy. This and still further objects will become apparent from the following description read in conjunction with the drawing in which Fig. 1 is a flow sheet showing an embodiment of a plant set-up for effecting the process in accordance with the invention, and Fig. 2 is a flow sheet of a further embodiment of a plant set-up operating in accordance with the invention.

It has now been found that the synthesis products obtained by catalytic carbon monoxide hydrogenation may be cracked with practically no residue and it is possible to effect a combination of the thermal cracking of the high boiling hydrocarbons, of the fractionation of the total products and of the hot reforming of the hydrocarbons boiling in the gasoline range. The combination has been found to be extremely favorable from an economic and operational standpoint and with respect to the heat technology. This combination will hereinafter be referred to as "Thermoforming."

The products treated, in accordance with the invention, are the total primary products from carbon monoxide hydrogenation which may be liquefied at normal pressure exclusive of the reaction water and products dissolved therein. These products will be referred to hereinafter as the primary synthesis products. The products in the boiling range of about the reactor paraffins will be referred to as the higher boiling primary synthesis products while the remainder of the products, i. e. the heat exchanger condensate, the cold condensate and the low temperature condensate, will be referred to as the lower boiling primary synthesis products.

In accordance with the invention, the treatment of the primary synthesis products for the processing into gasoline and diesel oil with fractionation thermal cracking of the higher boiling constituents and hot reforming of the gasoline range boiling hydrocarbons is so effected that the higher boiling primary synthesis products are passed through a cracking reactor and the cracked products are passed to a fractionating column. The lower boiling primary synthesis products including the heat exchanger condensate, the cold condensate and the low temperature condensate are also passed to this fractionating column. In the fractionating column, the hydrocarbons in the gasoline and diesel oil boiling range are separaetd. The gasoline range boiling hydrocarbons are passed in indirect heat exchange contact with the hot cracked product coming from the cracking reactor and thereafter through a hot reforming unit. The diesel oil is recovered from the fractionating column and gasoline is recovered from the hot reforming unit. The sensible heat of the gasoline coming from the hot reforming unit is preferably also utilized in accordance with the invention. This may be effected, for example, by passing the same in indirect heat exchange contact with a portion of the lower boiling synthesis products being passed through the fractionating column or by passing the same in indirect heat exchange contact with the gasoline boiling range hydrocarbons being passed from the fractionating column to the hot reforming unit prior to the indirect heat exchange contact with the cracked product from the cracking reactor. The fractionation of the primary products and the cracked products is effected in a common fractionation unit.

The operation of the "Thermoforming" process is illustrated in the flow sheets.

"Reactor paraffin" is sucked through line 1 and heated to 450–500° C. in tubular furnace cracking reactor 2 while maintaining the pressure at such a level that the reactor paraffin will not evaporate. After adequate heating, the hydrocarbons, while being released from pressure, are passed into a separator 3 where a separation of vaporous and liquid constituents takes place. Water vapor which has been heated in tubular furnace 2 to about 500° C. is simultaneously passed through line 4 into separator 3.

Line 5 contains the "heat exchanger condensate." It is pre-heated in heat exchanger 6 and at first passed into column 13 where any low boiling constituents are removed. From the bottom of column 13, the high boiling constituents of the "heat exchanger condensate" pass at first into a separate tubular coil positioned in the tubular cracking reactor 2 where they are heated to 500–520° C. Then under a pressure of 3–10 kg./sq. cm., the high boiling constituents pass into the vapor-liquid separator 3 mentioned above.

From separator 3, the still liquid product, together with the reactor paraffin flowing in from line 1, is returned into the cycle to be heated and cracked again. The products escaping from separator 3 in the vaporous form, together with the injected water vapor, pass through the cracking zone of the tubular furnace 2. Following this, they pass through a cooler and heat exchanger 7. The constituents which, after cooling, are still in the gaseous state are passed to a fractionating column 13. The hydrocarbons liquefied in cooler 7 are recycled to the cracking furnace 2. A small part of the liquid products is branched off and separated from polymerized portions in a small distilling column 8 operated with water vapor. The polymerized material is withdrawn as the bottom product while the gaseous overhead products are passed to the fractionating column 13.

The "cold condensate" contained in line 9 is passed through a heat exchanger 10 and into the fractionating column 13. The condensate contained in line 11 of the oil scrubbing unit, low-temperature treating unit or active carbon treating unit (low temperature condensate) is likewise passed, via heat exchanger 12, to the column 13. At the top of column 13, gasoline and cracked gases are withdrawn. In separator 14, the gasoline condensed in heat exchanger 12 is separated from the gaseous constituents. This gasoline, except for the part returned as reflux to the top of the column, passes to heat exchanger 7 where it is evaporated and heated to the reaction temperature (about 450° C.) of the bleaching earth treatment (hot, reforming).

In cases where the boiling range of the primary products to be processed is shifted to a larger extent into the area of the low boiling hydrocarbons and the portion of hydrocarbons to be cracked is consequently smaller, the gasoline coming from separator 14, prior to being heated in heat exchanger 7 is evaporated and pre-heated in heat exchanger 6. In these cases, the heat exchanger condensate coming from line 5 is preheated in another suitable manner.

The gasoline vapors, adequately heated in exchanger 7 or in exchanger 6 and 7, pass through two or more alternately operated reactors 15 (designated 15a, 15b and 15c in the drawing) in which the isomerization of the hydrocarbons is effected on bleaching earths or other suitable catalysts. The sensible heat of the vapors flowing off from the isomerization unit is transferred in heat exchanger 6 to the "heat exchanger condensate" to be processed and coming from line 5 or, as mentioned above, to the gasoline to be evaporated and coming from separator 14. Thereafter, the gasoline hydrocarbons treated with bleaching earth or other catalysts are passed to a rerun distillation unit to remove higher boiling constituents which may form in a small quantity during the isomerization.

The cracked gases obtained by distillation in fractionating column 13 and separated in separator 14 are passed to a storage container 16 and, from thence, are sucked by a compressor 17 and compressed for the purpose of recovering $C_3C_4$ hydrocarbons.

The hydrocarbons boiling in the diesel oil range are withdrawn from fractionating column 13 via a stripper 18. The sensible heat of these hydrocarbons is used, in heat exchanger 10, for heating the "cold condensate" coming from line 9. Thereafter, the diesel oil fraction is passed into a line 19.

The residues collecting at the bottom of column 13, as mentioned above, are returned to the cracking furnace 2.

The flow diagram shown in Fig. 2 illustrates a modified embodiment of the "Thermoforming" process.

Deviating from the operation method illustrated in Fig. 1, the gases leaving the cracking furnace 2, prior to passing through the heat exchanger 7, are passed into a chamber 8a where they are precooled (chilled) with injected cold oil. For this purpose, use is made of the "heat exchanger condensate" contained in line 5 which previously flows through heat exchanger 6. In chamber 8a, due to the oil injection, liquid and solid constituents separate and are further processed in the steam-operated distilling column 8 just as in the embodiment of the process illustrated in Fig. 1. The gases flowing off from column 8 are combined with the cracking gases flowing off from container 8a.

A modification of the process of the invention which is independent of the type of polymerisate separation in container 8 and concerns the performance of the hot reforming is also illustrated in Fig. 2.

In the "Thermoforming" process, the heat requirements of the reaction, as is known, are met by the sensible heat of the entering gasoline vapors. During the passage through the apparatus, the vapors correspondingly cool down. It is preferable for some products if the gases are not allowed to cool down to such a low level during hot reforming and if the reaction is effected in two stages in order that the gasoline vapors can be heated between the stages.

The effluent gases from the first stage of the hot reforming unit 15 which is composed of reactors 15a and 15b and an additional reactor 15c for regenerating the bleaching earths used in the hot reforming are heated by hot cracked gases in a heat exchanger 7a. The products leaving the second stage of the bleaching earth treating unit 15 which is composed of reactors 15a and 15b and an additional reactor 15c for regenerating the bleaching earths used in the hot reforming transfer a part of their heat in heat exchanger 6a to the gasoline flowing off from separator 14 before this gasoline is further heated in heat exchanger 7. The heat content remaining thereafter of the products treated with bleaching earth, just as in the embodiment illustrated in Fig. 1, is transferred to the "heat exchanger condensate" coming from line 5.

For the regeneration of the bleaching earths used for the hot reforming step, an additional reactor is required which in Fig. 2 is designated by the numeral 15c. The reactors 15a to 15c operate in the conventional manner in a three-unit cycle. The reactor 15c, depending on the operational circumstances, may either cooperate with reactor 15a or with reactor 15b.

The process of the invention for processing carbon monoxide hydrogenation products into gasoline and diesel fuels results in a considerable saving in investment and operation cost as compared with the conventional mode of operation. It is now possible to simultaneously meet the heat requirements for the fractionation of the primary products and for performing the hot reforming of the hydrocarbons boiling in the gasoline range (isomerization) with the same amount of heat which was hitherto alone was necessary for the thermal cracking of the high boiling constituents. The savings of equipment include two tubular furnaces and a fractionating unit for the primary products. The operation cost of the plant is likewise reduced to a corresponding extent.

The essential feature of the invention consists in that the heat content of the hot vapors leaving the cracking reactor is used for heating the gasoline vapors to be passed into the hot reforming unit. A use of this kind of the hot cracked vapors is only possible in the processing of synthesis products obtained from catalytic carbon monoxide hydrogenation. When processing starting materials of this kind, practically no carbon deposits form which would make difficult or prevent a heat exchange between the hot vapors of the cracking reactor and the gasoline vapors. With other starting materials, especially with petroleum products, this heat exchange is technically impossible owing to the carbon deposits forming.

The process of the invention has the further advantage that the separation by distillation of the cracked products may be combined with the processing by distillation of the heat exchanger condensate, cold condensate and low temperature condensate obained from catalytic carbon monoxide hydrogenation.

The synthesis reactor paraffin admitted through line 1 boils above 300° C. The main portion of this fraction consists of hydrocarbons having a molecular size of above $C_{30}$ and boiling above 460° C. The heat exchanger condensate admitted through line 5 has a boiling range of 150–400° C. The main portion of this fraction consists of $C_{11}$ to $C_{25}$ hydrocarbons. The so-called cold condensate having a boiling range of 0–300° C. is passed through line 9. The main portion of this fraction consists of $C_7$ to $C_{11}$ hydrocarbons. The low temperature condensate coming in through line 11 boils between —20° C. and 150° C. and chiefly consists of $C_3$ to $C_6$ hydrocarbons.

The primary gasoline hydrocarbons formed in carbon monoxide hydrogenation and the gasolines forming by cracking are passed to the so-called hot reforming unit. Here, with the use of special catalysts, a thermal treatment is effected at 350–450° C. thereby increasing the octane number. The increase in octane number is partially caused by a shifting of the double bonds from the terminal to the middle portions of the hydrocarbon molecules and partially by an increase of the degree of branching.

The hot reforming of hydrocarbons has been known for a long time in the art and has been described, for example, by Zebe in "Mineraloele und verwandte Produkte," page 1213 (1952), by Marder in his book "Motorkraftstoffe," page 320 (1942) and in a paper by Hermann Velde published in "Oel und Kohle," volume 37, page 143 (1941).

During the hot reforming process, the catalyst, after a prolonged operation period, becomes covered with carbon deposits. These carbon deposits are removed by burning off with air and passing over hot steam. For this purpose, the two reactors of the hot reforming unit are alternately taken off stream after a certain operation time.

The gasoline vapors leaving the reactors of the hot reforming unit are processed in the distilling column 13 after having left the heat exchanger 6 (Fig. 1 and Fig. 2).

The thermal cracking unit is intended to crack those quantities of hydrocarbons boiling above 360° C. which are not used for the paraffin recovery in the carbon monoxide hydrogenation thereby forming preferably terminal olefins boiling below 300° C. These olefins which boil above the range of $C_{10}$ may be used as starting material for the production of lubricating oils. The fractions boiling in the range of the $C_5$ to $C_9$ hydrocarbons are desirable highly knock-resistant gasoline components. The propene and butenes may be used as starting materials for the production of polymerized gasoline.

The high boiling paraffins, i. e. the so-called reactor paraffins, passed in through line 1 are subjected to cracking in the liquid phase prior to being passed to cracking in the vapor phase, thereby splitting the paraffins in the midst of the molecules. In the liquid separator, the vaporous cracked products separate from the portions remained in the liquid state before the latter are returned into the cracking zone.

The lower boiling feed products, together with the reflux, are withdrawn from the bottom of column 13 and evaporated in a convection zone of the furnace 2 and then passed to the separator 3. The vapors should reside only a short time in the cracking zone. For this reason, several parallel tubes are arranged within the cracking zone. Moreover, hot steam is passed into the cracking zone to reduce the residence time in said zone. The hot cracked vapors, when leaving the cracking reactor, have a temperature of about 530° C. These vapors must be cooled to a temperature of below 400° C. before being passed into the distilling column 13.

The removal of heat required for this purpose may be effected by indirect heat exchange because practically no carbon deposits are to be expected in the cracking of products from carbon monoxide hydrogenation.

The following example is given by way of illustration and not limitation:

*Example*

1.4 tons/hr. of reactor paraffin, under 30 atmospheres and in the liquid phase, were pre-cracked at about 480° C. and expanded into the separator 3 where 350 kg./hr. of liquid portions were obtained and passed to the feed pump. 1.3 tons/hr. of steam under 18 atmospheres were superheated to 510° C. in a second tubular system and likewise passed into separator 3. The hydrocarbon portions of the cold and hot condensate boiling up to about 300° C., together with the reflux, amounting to 14.35 tons/hr. were evaporated in a third tubular system at the bottom of the cracking column 13 and also passed to the separator 3. All of the hydrocarbon vapors from separator 3 were cracked at a temperature of 530° C., measured at the reactor outlet, to the extent of about 25% by a system of 5 parallel tubes arranged in the radiation zone of the reactor. The hydrocarbon vapors in amount of 15.75 tons were cooled to about 398° C. in heat exchanger 7 and passed into column 13. The heat was utilized for evaporating 7.6 tons/hr. of gasoline obtained at the top of the column 13. This gasoline, superheated to 470° C., was then passed to reactors 15a and 15b. A part of the heat content of the vapors leaving the reactors of the hot reforming unit was used in heat exchanger 6 to preheat to 230° C. 5.5 tons/hr. of heat exchanger condensate which were then passed to the column 13. In stripper 18, 3.5 tons/hr. of portions boiling within the range of $C_{12}$–$C_{16}$ were withdrawn and cooled to about 50° C. in heat exchanger 10 while heating 2.77 tons/hr. of cold condensate to about 180° C. At the top of column 13, 0.92 ton/hr. of cracked gas and 7.6 tons/hr. of gasoline in the vaporous form were obtained without taking into account the reflux of the column. The gasoline vapors were condensed in heat exchanger 12, while simultaneously heating up 2.5 tons/hr. of low temperature condensate, and then passed to separator 14. The cracked gas withdrawn from separator 14, after being released from pressure, was passed to the gas holder 16 and thence sucked by a compressor for further processing.

I claim:

1. Process for the operation of a thermal cracking reactor, a fractionating column and a hot reforming unit for the processing of synthesis products from catalytic carbon monoxide hydrogenation into gasoline and diesel oil which comprises separating the reaction products from said synthesis, i. e., liquid primary synthesis products into higher boiling primary synthesis products and lower boiling primary synthesis products, said latter product including the heat exchanger condensate, the cold condensate and the low temperature condensate passing the higher boiling primary synthesis products through the cracking reactor, passing the cracked product from the cracking reactor to the fractionating column, passing the lower boiling primary synthesis products to the fractionating column, separating gasoline and diesel oil range hydrocarbons in the fractionating column, passing the gasoline range hydrocarbons in indirect heat exchange contact with the cracked product coming from the cracking reactor and thereafter through the hot reforming unit and recovering gasoline from the hot reforming unit and diesel oil from the fractionating column.

2. Process according to claim 1 in which a portion of the lower boiling primary synthesis products is passed in indirect heat exchange contact with the gasoline from the hot reforming unit prior to being passed to the fractionating column.

3. Process according to claim 2 in which the heat exchanger condensate portion of the lower boiling primary synthesis products is passed in indirect heat exchange with the gasoline from the hot reforming unit prior to being passed to the fractionating column.

4. Process according to claim 1 in which the gasoline range hydrocarbons are passed in indirect heat exchange contact with the gasoline from the hot reforming unit prior to being passed in indirect heat exchange with the cracked product from the cracking reactor.

5. Process according to claim 1 which includes partially pre-cooling the effluent gases from the cracking reactor by injecting a portion of the heat exchanger condensate portion of the lower boiling primary synthesis products.

6. Process according to claim 1 in which the hot reforming unit has at least two stages and in which the gasoline range hydrocarbons being passed from the first stage to the second stage are passed in indirect heat exchange contact with a portion of the cracked product from the cracking reactor.

7. Process according to claim 1 in which the heat exchanger condensate portion of the lower boiling primary synthesis products is passed in indirect heat exchange with the gasoline from the hot reforming unit prior to being passed to the fractionating column, the cold condensate portion of the primary synthesis product is passed in indirect heat exchange contact with the diesel oil from the fractionating column prior to being passed through the fractionating column, and the low temperature condensate portion of the lower boiling primary synthesis products is passed in indirect heat exchange contact with the overhead product from the fractionating column prior to being passed to the fractionating column.

8. Process according to claim 1 in which the heat exchanger condensate portion in the lower boiling primary synthesis products is passed in indirect heat exchange contact with the gasoline from the hot reforming unit, thereafter a portion passed to the fractionating column and the remainder injected into the cracked product from the cracking reactor for the partial pre-cooling thereof, a portion of the cracked product after said injecting being passed in indirect heat exchange contact with the gasoline range hydrocarbon passing from a first to a second stage in the hot reforming unit and another portion being passed in indirect heat exchange contact with the gasoline range hydrocarbon being passed to the hot reforming unit, the cold condensate portion of the low boiling primary synthesis products being passed in indirect heat exchange contact with the diesel oil from the fractionating column prior to being passed to the fractionating column and the low temperature condensate portion of the low boiling primary synthesis products being passed in indirect heat exchange contact with the overhead product from the fractionating column prior to being passed to the fractionating column.

9. Process according to claim 8 in which the gasoline range hydrocarbons are passed in indirect heat exchange contact with the gasoline from the hot reforming unit prior to being passed in indirect heat exchange contact with a portion of the cracked product from the cracking reactor, said indirect heat exchange contact between the gasoline from the hot reforming unit and the gasoline range hydrocarbon being effected prior to the indirect heat exchange contact between the gasoline from the hot reforming unit and the heat exchanger condensate portion of the lower boiling primary synthesis product.

References Cited in the file of this patent
UNITED STATES PATENTS

| | | |
|---|---|---|
| 2,461,065 | Kemp | Feb. 8, 1949 |
| 2,467,407 | Ruthruff | Apr. 19, 1949 |
| 2,470,216 | Keith | May 17, 1949 |
| 2,542,454 | Arnold et al. | Feb. 20, 1951 |
| 2,671,104 | Grahame et al. | Mar. 2, 1954 |
| 2,698,782 | Coghlan | Jan. 4, 1955 |